Oct. 14, 1952  A. J. SYROVY  2,613,503
ROTARY HYDRAULIC TORQUE CONVERTER
Filed Aug. 5, 1948
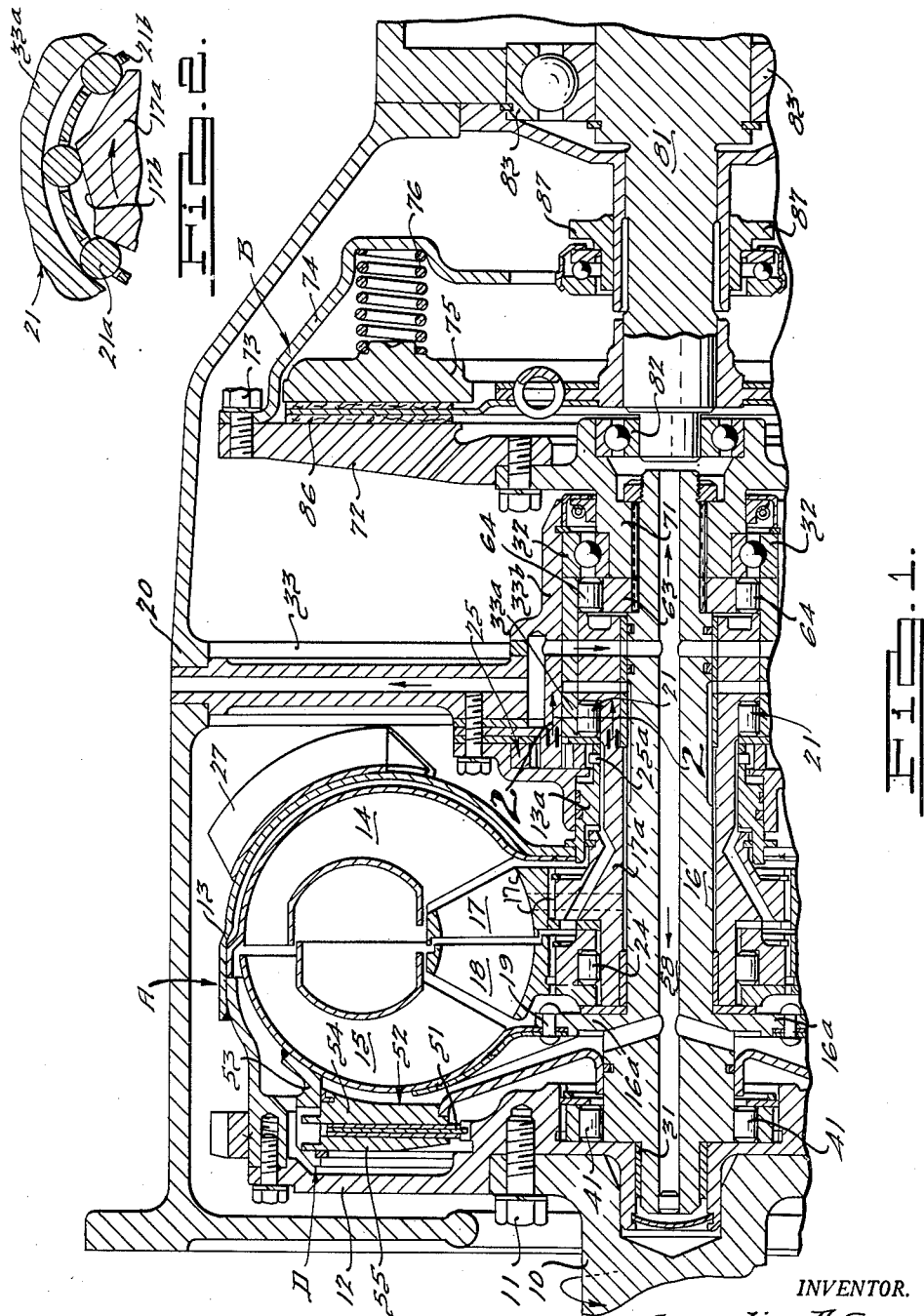
INVENTOR.
Augustin J. Syrovy
BY
Harness and Harris
ATTORNEYS.

Patented Oct. 14, 1952

2,613,503

UNITED STATES PATENT OFFICE 2,613,503

ROTARY HYDRAULIC TORQUE CONVERTER

Augustin J. Syrovy, Detroit, Mich., assignor to Chrysler Corporation, Highland Park, Mich., a corporation of Delaware Application August 5, 1948, Serial No. 42,725

2 Claims. (Cl. 60—54)

This invention relates to hydraulic torque converters and particularly to the means for mounting a plurality of guide or reaction wheels in a torque converter unit.

It is a primary object of this invention to mount the several converter guide wheels in such a manner that wear of certain of the converter elements associated with the guide wheels is materially reduced due to a reduction in differential speeds of certain of the converter elements associated with the guide wheels.

It is a further object of this invention to improve the life and efficiency of a multi-guide wheel torque converter by connecting the several guide wheels to each other and to the supporting casing through a rotatable hub member and a plurality of one-way brakes, clutches or freewheeling devices.

It is another object of this invention to provide an improved and simplified arrangement for mounting a plurality of guide wheels or the like within a supporting unit, the arrangement lending itself to easy, economical manufacture and assembly.

It is a further object of this invention to mount a plurality of the wheels of a torque converter or the like on a rotatable hub member and to connect this hub member to the supporting casing through a one-way brake device such that the supporting casing will at certain times directly resist the torque loads created by the several wheels.

Other objects and advantages of this invention will be apparent from a consideration of the attached specification and related drawing wherein:

Fig. 1 is a partial sectional elevational view of my fluid power transmitting device which includes a torque converter unit connected in series with a friction clutch device; and Fig. 2 is a fragmentary sectional elevational view taken along the line 2—2 of Fig. 1 disclosing the type of one-way brake or free-wheeling means used to accomplish the objects of this invention.

Fig. 1 of the drawing discloses a fluid power transmitting device including a hydraulic torque converter unit A. Converter unit A is drivingly connected to a friction clutch unit B and both units are supported in a stationary or fixed housing 20. The reference numeral 10 represents an end portion of a driving member, such as the engine crankshaft of a motor vehicle power unit. The shaft 10 is journaled in the housing 20 and is fixedly connected to a flywheel assembly 12 by the screw means 11. The flywheel assembly 12 carries the torque converter casing 13 within which are mounted the converter components, namely, the impeller member 14, the turbine or runner member 15, and the primary and secondary guide wheel members or reaction wheels 17 and 18 respectively. The vaned impeller wheel 14 is fixedly connected to the converter casing 13 and is accordingly adapted to be rotatably driven by the driving shaft 10. The vaned turbine wheel 15 is drivingly connected by rivet means 19 to a radially extending flange portion 16a formed on the forward end portion of the driven shaft member 16.

The driven shaft member 16 is adapted to transmit drive between the torque converter unit A and the friction clutch unit B. The forward end portion of shaft 16 is piloted in the hub of the flywheel assembly 12. A sleeve type bearing 31 rotatably supports the forward end of shaft 16 in the flywheel hub. The rear end portion of shaft 16 is rotatably supported by a bearing assembly 32 mounted in an axially extending sleeve portion 33b projecting from the housing wall 33.

The vaned primary guide wheel 17 is rotatably supported on driven shaft 16 by means of the guide wheel hub portion 17a. Wheel 17 is drivingly connected to hub 17a by means of splines 17c. Hub portion 17a is adapted to be connected to the housing 20 through an overrunning or one-way brake device 21 associated with the sleeve portion 33a carried by the housing wall 33. As clearly shown in Fig. 2, the one-way brake device 21 comprises rollers 21a mounted within a cage member 21b. The cage member 21b is normally urged into drive transmitting position by means of a tension spring (not shown). Cam surfaces 17b, formed on the peripheral surface of the guide wheel hub portion 17a, cooperate with the clutch rollers 21a and the interior surface of the housing sleeve portion 33a to permit only forward or clockwise rotation of the guide wheel 17 when looking in the direction of arrows 2—2 of Fig. 1. The sleeve portion 33a which constitutes an outer race for the rollers 21a of the one-way brake device 21, is fixedly connected to the transmission housing wall 33 in any approved manner. It is obvious that the one-way brake 21 permits forward rotation to be transmitted to guide wheel 17 by forward rotation of the impeller 14 but restrains rotation of the guide wheel 17 in a reverse or counterclockwise direction.

The secondary guide wheel 18 is rotatably mounted on the axially extending forward end of the primary guide wheel hub portion 17a by means of the overrunning or one-way brake device 24. The one-way brake device 24 is similar in design to the brake device 21, shown in Fig. 2. The brake device 24 is designed so as to restrain rotation of guide wheel 18 in a counterclockwise direction when looking from the forward or driving end of the power transmitting unit in the direction of arrows 2—2 of Fig. 1. It will be noted that guide wheel 18 is connected to the transmission housing wall 33 through the brake device 24, the hub portion 17a of the guide wheel 17, and the brake device 21. This particular arrangement permits relative rotation between the guide wheels 17 and 18 in a forward direction but restrains reverse or counterclockwise rotation of either or both of the guide wheels 17 and 18.

Heretofore it has been common practice (see U. S. Patent 2,196,585) to connect the several guide wheels of a fluid operated torque converter unit to a sleeve-like, forwardly projecting, axially extending, stationary member mounted on the converter housing. This sleeve member is generally connected to the associated converter housing wall by splines, a brake mechanism, or the like. Usually this stationary housing sleeve member is positioned in the same location as the hub portion 17a of the converter herein disclosed. The several guide wheels of the conventional construction are usually separately connected to the forward end portion of this relatively fixed sleeve member through free-wheeling or one-way brake devices. Such an arrangement provides the necessary reaction means for the converter unit but it tends to materially increase the wear of the converter elements due to the fact that the converter casing flange similar to the element 13a herein disclosed is frequently rotating at one speed, the axially extending, supporting sleeve for the guide wheels, located in a position similar to the hub 17a, is fixed or stationary, and the turbine driven shaft 16, located concentrically within the stationary guide wheel supporting sleeve, is rotating at still a different speed. This difference in rotative speeds of the three concentrically arranged converter members, corresponding to the herein disclosed members 13a, 17a and 16, materially increases the wear of these members in the conventional converter unit. By the construction herein disclosed the speed differential between these concentrically arranged members is materially reduced and this accordingly reduces the wear of these elements and the elements associated therewith.

Another advantage of the particular construction herein disclosed is that the torque load applied by the guide wheels 17 and 18, when the one-way brake devices 24 and 21 lock-up, is transmitted directly to the housing wall portion 33a which wall portion can adequately withstand the reaction loads. With the conventional construction the guide wheel brake devices are each mounted on the forward end portion of an axially extending sleeve member and on lock-up of the brake devices the torque load is applied to the forward end of the cantilever-type sleeve member and transmitted along the sleeve member to the supporting housing wall. Such a construction causes high bending, torsional, and shearing stresses to be developed in the sleeve member and this has a tendency to accelerate fatigue and deterioration of the sleeve member.

In addition, the particular guide wheel arrangement herein disclosed, comprising a rotatable sleeve-like hub 17a and a plurality of one-way brakes 21 and 24, is much easier to manufacture and assemble than an arrangement having a stationary, axially projecting, reaction sleeve supporting the several guide wheels through one-way brakes located on its free end due to the fact that the fixed connection of the sleeve to the housing is eliminated. As a result of the particular arrangement of elements herein disclosed the guide wheels 17 and 18, connected to the transmission housing wall 33 through the one-way brake devices 21 and 24 and the rotatable hub 17a provide the reaction means for the torque converter unit yet reduce the initial cost and increase the overall life of the converter unit. By using a plurality of guide wheels, connected to the transmission housing through separate one-way clutches, the efficiency and operating characteristics of the converter unit are materially improved and for that reason this construction is of particular importance.

An overrunning or one-way brake device 41 is mounted between the forward end portion of shaft 16 and the encircling hub portion of the flywheel assembly 12. This one-way brake device 41 is designed so as to prevent the speed of the driving shaft 10 from dropping below the speed of the driven shaft 16. Such an arrangement is quite advantageous due to the fact that it provides a means for obtaining engine braking in an engine driven power transmitting device having a slip characteristic. Without some positive lock-up means between the driven shaft 16 and the driving shaft 10, on coast drive, slip would occur in the torque converter unit that would tend to nullify the braking effect of the power unit drivingly connected to the shaft 10. The brake device 41 has particular importance in motor vehicle drive for not only does it provide a means for obtaining engine braking on coast drive, but it also provides a means that automatically locks the driven shaft 16 to the driving shaft 10 to facilitate starting of the engine, that is connected to shaft 10, by towing or the like. The free-wheeling or one-way brake device 41 is similar in design to the one-way brake device 21 shown in Fig. 2 but the cams on the shaft 16 that cooperate with the rollers of the device 41 are slanted in a direction opposite to that of the cam surfaces 17b. Such an arrangement insures lock-up of the brake device 41 when the driven shaft 16 drives the driving shaft 10 in a forward or clockwise direction (looking in the direction of arrows 2—2 of Fig. 1).

The torque converter unit A includes a gear type oil pump 25 having a driving gear which is directly connected by pin means 25a to the axially extending sleeve-like flange portion 13a of the rotatable converter casing 13. The pump 25 draws oil from a sump (not shown) and circulates it through the converter unit and the other associated hydraulically operated mechanisms. This pump 25 provides pressure fluid for lubricating purposes as well as for actuation of the various hydraulically operated control mechanisms (not shown) associated with the power transmission unit. The circulation of oil through the converter, by the pump 25, provides a means for maintaining the converter full of oil whenever shaft 10 is rotating. Furthermore, this circulation of the working fluid through the converter and the lubricating and control systems provides a means for cooling the converter fluid. To further assist in the cooling of the converter fluid, fins 27 are provided on the exterior surface of the converter casing 13 to circulate air about the converter casing which action tends to reduce the temperature of the fluid within the converter casing.

In order to provide means for transmitting a positive direct drive from the driving shaft 10 to the driven shaft 16 a torque converter lock-up clutch D is provided. The lock-up clutch D includes the radially extending, friction surfaced disc member 51, which member is drivingly mounted on the flywheel assembly 12. Cooperatively associated with the disc 51 is the hydraulically operated clutch actuating means 52, mounted on the turbine member 15 of the converter unit. The clutch actuating means 52 includes a cylinder 53 within which a piston member 54 is reciprocatably mounted. Cylinder 53 also supports a backing plate 55 adapted to cooperate with piston 54 to clampingly engage the disc member 51 when piston 54 is moved forwardly, as a result of the admission of pressure fluid to cylinder 53. Pressure fluid is supplied to cylinder 53 by pump 25 through the bore 58 in shaft 16. Spring means (not shown) normally urge the piston 54 rearwardly to a disengaged position. It will be noted that when the clutch piston 54 has engaged the disc member 51 with the backing plate 55 then the torque converter impeller member 14 and the turbine member 15 are locked together and a positive direct drive is transmitted from the driving shaft 10 to the driven shaft 16. The particular lock-up clutch construction herein disclosed is particularly advantageous for motor vehicle drive due to the fact that substantially the entire lock-up clutch mechanism is carried by the torque converter turbine member 15 which arrangement tends to reduce the inertia and increase the flexibility of the power unit driving the input shaft 10 and impeller 14. The lock-up clutch 52 is usually engaged after the torque multiplying effect of the converter has dropped to a low ratio but before the converter unit begins to function as a fluid coupling. By such an arrangement the torque multiplying effects of the converter unit is most advantageously used.

Splined to the rear portion of shaft 16 is a collar 63. Mounted between collar 63 and the portion 33a of housing wall 33 is a one-way brake device 64 which device is similar in design to the brake device shown in Fig. 2. Brake device 64 is adapted to prevent reverse or counterclockwise rotation of the shaft member 16 (when looking in the direction of the arrows 2—2 of Fig. 1.) The subject matter herein disclosed relating to the one-way brake devices 41 and 64 is covered by a separate application filed by William T. Dunn, Serial No. 38,135, under date of July 10, 1948, now U. S. Patent 2,548,207 dated April 10, 1951.

Also splined to the rear portion of shaft 16 is the hub portion 71 of the clutch backing plate 72. Plate 72 forms a portion of the driving side of the friction clutch B. Connected to the backing plate 72 by screws 73 is the clutch cover plate 74. Mounted between cover plate 74 and backing plate 72 is a pressure plate 75 which is normally urged towards backing plate 72 by the compression spring means 76.

A shaft 81, which can be the input shaft of a variable speed motor vehicle transmission, has its forward end portion rotatably supported in the bearing assembly 82 mounted in the hub portion 71 of the friction clutch backing plate 72. Shaft 81 is also rotatably supported by the bearing assembly 83 which is carried by the housing 20. Fixedly connected to the forward portion of shaft 81 is the radially extending friction surfaced, clutch disc 86. Clutch disc 86, which normally constitutes the driven side of clutch B, is positioned between the backing plate 72 and the pressure plate 75 so that it is normally clamped in drive transmitting engagement with the plates 72 and 75 due to the pressure exerted by the springs 76. When the clutch B is to be disengaged suitable means (not shown) are actuated through axial movement of the sleeve member 87 and pressure plate 75 is retracted rearwardly against the pressure exerted by the springs 76. Retraction of pressure plate 75 breaks the drive train from shaft 16 to shaft 81 and permits shaft 81 to rotate relative to the shaft 16.

The operation of the power transmitting device shown in Fig. 1 is as follows. Assume that an engine or some similar driving unit connected to shaft 10 tends to rotate the shaft 10 in a clockwise direction, as viewed from the forward end of the device looking in the direction of the arrows 2—2 of Fig. 1. Shaft 10 will rotate the converter casing 13 in a clockwise direction and this will drive the impeller member 14 in the same direction. The shaping of the vanes of the impeller, turbine and guide wheels of the converter unit is such that clockwise rotation of impeller 14 directs the converter fluid against the vanes of the turbine member 15 in a manner which tends to rotate the turbine 15 in a clockwise direction. On initiating drive through this torque converter unit the converter fluid passing from the impeller member across the turbine member is directed against the guide wheel vanes in such a manner that there is a tendency to rotate the guide wheels in a reverse or counterclockwise direction. As the one-way brake devices 21 and 24 restrain reverse rotation of the guide wheels 17 and 18, the guide wheels are locked-up in a substantially stationary condition and as a result the converter fluid is redirected from the guide wheels back into the turbine member to assist in the drive of the turbine member. The reaction effect produced by the locked-up guide wheels during starting drive through the converter unit produces the torque multiplication factor inherent in the fluid converter unit. As the speed of the turbine member 15 increases and the torque demand or load on shaft 16 begins to decrease, the speeds of the converter impeller member 14 and the turbine member 15 tend to attain substantially the same value. As the speeds of these members begin to approach the same value, the reaction forces directed against the guide wheel vanes gradually disappear and the impelled fluid within the converter begins to drive the guide wheels forwardly in a clockwise direction. The forward drive of the guide wheels is a step-by-step process as first the secondary guide wheel 18 is picked up by the converter fluid and rotated forwardly and thereafter the primary guide wheel 17 is driven forwardly. The use of a plurality of converter guide wheels smoothes out the forward acceleration of the guide wheels and improves the efficiency and operating characteristics of the converter unit.

If the speed of shaft 10 is increased and drive is continued through the torque converter unit, eventually the impeller, turbine and guide wheels will all rotate in the same direction at substantially the same speed and the converter unit will begin to function as a simple fluid coupling. However, due to the fact that the torque multiplying effect of the converter unit decreases rapidly with increase in speed of the driven turbine member 15 and also due to the fact that the overall efficiency of the converter unit drops off as the speed of the turbine member increases, suitable control means (not shown), automatically effect engagement of the torque converter lock-up clutch D, after the torque multiplying effect of the converter unit has been most advantageously utilized. This lock-up of clutch D is usually prior to the time the converter unit begins to function as a simple fluid coupling. After engagement of clutch D a positive direct drive is transmitted directly from the input or driving shaft 10, via clutch D, to the driven shaft 16.

As a result of applicant's design the manufacture and assembly of torque converters has been simplified and the cost reduced, and the operating life of the converter has been materially extended due to the reduction in wear and strain imposed upon the various component parts.

I claim:

1. A hydraulic torque converter mechanism comprising axially aligned, relatively rotatable driving and driven shafts, a closed converter casing having certain portions drivingly mounted on and extending concentrically about said driving shaft and other portions encircling said driven shaft but spaced radially outwardly therefrom, vaned impeller, turbine, and primary and secondary guide wheels mounted within said casing to provide a closed toroidal fluid flow circuit, said impeller wheel being drivingly connected to said driving shaft and said turbine wheel being drivingly connected to said driven shaft, an axially extending sleeve encircling said driven shaft and arranged to extend concentrically between the guide wheels hubs and the other portions of said casing and said driven shaft, said sleeve being rotatably mounted relative to said other portions of said casing and said driven shaft and having a first portion fixedly connected to one of said guide wheels and a second portion providing a hub journal for the other guide wheel, a first one-way brake device mounted between the second portion of said sleeve member and said other guide wheel, and a second one-way brake device connected between a third portion of said sleeve and a relatively fixed member.

2. A fluid driven transmitting device comprising a driving shaft, a hydraulic torque converter mounted concentrically about an end of said driving shaft comprising a casing having mounted therein a vaned impeller, a vaned turbine, and vaned primary and secondary guide wheels arranged for relative rotation and disposed so as to form a closed toroidal circuit, means drivingly connecting said driving shaft to said impeller, a driven shaft piercing said casing and drivingly connected to said turbine member, said driven shaft being axially aligned with said driving shaft and extending through the hub portions of said wheels, a sleeve-like hub member rotatably mounted on said driven shaft and extending concentrically between said converter guide wheel hubs and said driven shaft, means fixedly connecting said primary guide wheel to a portion of said hub member intermediate the ends thereof, a stepped formation in one end of said hub member, a first one-way brake means mounted in said step formation rotatably supporting and drivingly connecting said secondary guide wheel to said one end of said hub member for forward rotation relative thereto, a second one-way brake means connecting the other end of said hub member to a relatively stationary member, said first and second one-way brake devices restraining reverse rotation of said guide wheels, and a one-way clutch arranged concentrically between and connecting mating portions of said driving and driven shafts to prevent overrunning of said driven shaft relative to said driving shaft in a forward direction.

AUGUSTIN J. SYROVY.

REFERENCES CITED

The following references are of record in the file of this patent:

UNITED STATES PATENTS

| Number | Name | Date |
|---|---|---|
| 1,760,480 | Coats | May 27, 1930 |
| 1,855,967 | Jandasek | Apr. 26, 1932 |
| 1,965,518 | Wilson | July 3, 1934 |
| 2,196,585 | Gette | Apr. 9, 1940 |
| 2,222,618 | Jandasek | Nov. 26, 1940 |